(12) United States Patent
Gan et al.

(10) Patent No.: US 11,796,127 B2
(45) Date of Patent: Oct. 24, 2023

(54) LINKAGE STRUCTURE

(71) Applicant: Nokia Solutions and Networks Oy, Espoo (FI)

(72) Inventors: Guichu Gan, Zhejiang (CN); Dai Ru Zhu, Zhejiang (CN); Chun Long Wang, Zhejiang (CN)

(73) Assignee: Nokia Solutions and Networks Oy, Espoo (FI)

( * ) Notice: Subject to any disclaimer, the term of this patent is extended or adjusted under 35 U.S.C. 154(b) by 92 days.

(21) Appl. No.: 17/593,137

(22) PCT Filed: Mar. 18, 2020

(86) PCT No.: PCT/EP2020/057470
§ 371 (c)(1),
(2) Date: Sep. 10, 2021

(87) PCT Pub. No.: WO2020/187993
PCT Pub. Date: Sep. 24, 2020

(65) Prior Publication Data
US 2022/0186876 A1 Jun. 16, 2022

(30) Foreign Application Priority Data
Mar. 21, 2019 (CN) .......................... 201910217421.2

(51) Int. Cl.
*H01Q 3/00* (2006.01)
*F16M 13/02* (2006.01)
(Continued)

(52) U.S. Cl.
CPC ..... *F16M 13/022* (2013.01); *F16M 2200/061* (2013.01); *H01Q 1/125* (2013.01); *H01Q 1/1228* (2013.01); *H01Q 3/06* (2013.01)

(58) Field of Classification Search
CPC ........... F16M 13/022; F16M 2200/061; F16M 11/10; F16M 11/2021; F16M 13/02;
(Continued)

(56) References Cited
U.S. PATENT DOCUMENTS 2,758,816 A  8/1956 Pickard et al. ............... 254/126
9,478,845 B2 * 10/2016 Hemmervall ........ H01Q 1/1228
(Continued)

FOREIGN PATENT DOCUMENTS

CN 207 051 396 U 2/2018
DE 297 20 393 U1 1/1998
EP 1 845 301 A2 10/2007

*Primary Examiner* — Amy J. Sterling
(74) *Attorney, Agent, or Firm* — Harrington & Smith

(57) ABSTRACT

The present disclosure provides a linkage structure including an upper bracket and a lower bracket, wherein said upper bracket includes a first linkage unit, a second linkage unit, a middle piece and two sets of adjusting pieces, one end of said middle piece is connected to said first linkage unit and the other end is connected to said second linkage unit; wherein at least one adjusting piece in each set of adjusting pieces is connected rotatably to said first linkage unit or said second linkage unit. According to the linkage structure of the present disclosure, mechanical tilt can be achieved by driving two sets of adjusting pieces to move in coordination, it can ensure the accuracy of mechanical tilt, realize mechanical tilt at any angle, and the operation process is friendly and safe.

15 Claims, 10 Drawing Sheets

(51) Int. Cl.
*H01Q 1/12* (2006.01)
*H01Q 3/06* (2006.01)

(58) Field of Classification Search
CPC .. F16M 11/16; F16M 11/2092; H01Q 1/1228;
H01Q 1/125; H01Q 3/06; F16B 2/12;
F16B 5/0216; F16B 9/054; F16B 7/06
See application file for complete search history.

(56) References Cited

U.S. PATENT DOCUMENTS

| | | |
|---|---|---|
| 10,079,423 B2 * | 9/2018 | Asrokin ............... H01Q 1/1264 |
| 2008/0086816 A1 | 4/2008 | Farooqui ........................... 5/611 |
| 2018/0013200 A1 | 1/2018 | Clifford et al. |
| 2022/0344798 A1 * | 10/2022 | Park ........................ H01Q 3/06 |
| 2022/0393333 A1 * | 12/2022 | Liu ........................ H01Q 1/125 |
| 2023/0012739 A1 * | 1/2023 | Udagave ............... H01Q 1/246 |

* cited by examiner

LINKAGE STRUCTURE

Cross Reference to Related Application

This patent application is a U.S. National Stage application of International Patent Application Number PCT/EP2020/057470 filed Mar. 18, 2020, which is hereby incorporated by reference in its entirety, and claims priority to CN 201910217421.2 filed Mar. 21, 2019.

TECHNICAL FIELD

The present disclosure relates to the field of mechanical technology, in particular, to a linkage structure.

BACKGROUND

In the prior art, linkage structures for mechanical tilt are widely used in various fields to achieve linkage and mechanical tilt between two objects. The current linkage structures, when carrying out mechanical tilt, usually require loosening the screws at the joints first, then adjusting manually the position of the object whose tilt angle needs to be changed in order to adjust it to the required angle, and then fixing the screws while maintaining the object at this angle.

BRIEF SUMMARY

An objective of the present disclosure is to provide a linkage structure for mechanical tilt.

According to one aspect of the present disclosure, there is provided a linkage structure, comprising an upper bracket and a lower bracket, wherein said upper bracket comprises a first linkage unit, a second linkage unit, a middle piece and two sets of adjusting pieces, one end of said middle piece is connected to said first linkage unit and the other end is connected to said second linkage unit; wherein at least one adjusting piece in one set of adjusting pieces is connected rotatably to said first linkage unit, and at least one adjusting piece in the other set of adjusting pieces is connected rotatably to said second linkage unit.

In some embodiments, said first linkage unit has a first through hole for cooperating with said middle piece, said second linkage unit has a second through hole for cooperating with said middle piece, and said middle piece goes through said first through hole and said second through hole.

In some embodiments, said first through hole and said second through hole have threads therein, one side of said middle piece has threads for cooperating with the threads within said first through hole, and the other side of said middle piece has threads for cooperating with the threads within said second through hole.

In some embodiments, said middle piece comprises multiple segments that can be moved relative to one another.

In some embodiments, said first linkage unit has thereon a first blind hole or a third through hole, said second linkage unit has a first blind hole or a third through hole, said second linkage unit has a second blind hole or a fourth through hole, one segment of said multiple segments cooperates with said first blind hole or said third through hole, and another segment of said multiple segments cooperates with said second blind hole or said fourth through hole.

In some embodiments, one segment of said multiple segments is connected fixedly on said first linkage unit, and another segment of said multiple segments is connected fixedly on said second linkage unit.

In some embodiments, said first linkage unit has only one rotation joint, at least one adjusting piece in one set of adjusting pieces is connected rotatably to the rotation joint on said first linkage unit, said second linkage unit has only one rotation joint, and at least one adjusting piece in the other set of adjusting pieces is connected rotatably to the rotation joint on said second linkage unit.

In some embodiments, said first linkage unit has two rotation joints, at least two adjusting pieces in one set of adjusting pieces are respectively connected rotatably to the two rotation joints on said first linkage unit, said second linkage unit has two rotation joints, and at least two adjusting pieces in the other set of adjusting pieces are respectively connected rotatably to the two rotation joints on said second linkage unit.

In some embodiments, each adjusting piece in said two sets of adjusting pieces is of the same length.

In some embodiments, at least two adjusting pieces in the same set are of different lengths, and two symmetrical adjusting pieces located in different sets are of the same length.

In some embodiments, said upper bracket further comprises a third linkage unit for connecting fixedly to a first object, wherein said third linkage unit is connected rotatably to at least one adjusting piece in each set of adjusting pieces.

In some embodiments, said upper bracket further comprises a fourth linkage unit for connecting fixedly to a second object, wherein said fourth linkage unit is connected rotatably to at least one adjusting piece in each set of adjusting pieces.

In some embodiments, said linkage structure further comprises a fifth linkage unit for connecting said upper bracket and said lower bracket.

In comparison with the prior art, the present disclosure has the following advantages: two sets of adjusting pieces can be driven to move in coordination in order to push the second object steadily toward one direction, therefore the second object can be rotated to a designated angle conveniently and accurately, thereby ensuring the accuracy of mechanical tilt and realizing mechanical tilt at any angle; there is no need to perform any processing on the junction between the linkage structure and the first object or the second object while carrying out mechanical tilt, and therefore no need to worry about the second object slipping down to maximum tilt angle during operation, which avoids the danger caused by the looseness of the junction, and the operation process is very safe; there is no need for the operator to hold the second object by hand in order to keep it at a certain tilt angle while carrying out mechanical tilt, thereby providing the operator with great convenience and making the operation process very friendly; furthermore, there is no limit on the length and/or weight of the second object that requires mechanical tilt, for example, the present disclosure can be used for mechanical tilt of 5G products that are over 1000 mm long and weigh over 40 kg.

BRIEF DESCRIPTION OF THE DRAWINGS

Other features, objectives, and advantages of the present disclosure will become more apparent through reading the following detailed depiction of the non-limitative embodiments with reference to the accompanying drawings:

FIG. 2b is a side view of the upper bracket shown in FIG. 2a;

FIG. 3b is a schematic view of an integral structure after connecting two objects with the linkage structure shown in FIG. 3a;

FIG. 3d is a structural schematic view of the upper bracket in FIG. 3a;

FIG. 3g is a structural schematic view of the lower bracket in FIG. 3a;

FIG. 5b is a schematic view of carrying out mechanical tilt based on a linkage structure including the upper bracket shown in FIG. 5a;

FIG. 6b is a schematic view of carrying out mechanical tilt based on a linkage structure including the upper bracket shown in FIG. 6a;

FIG. 8b is a schematic view of an integral structure after carrying out mechanical tilt with respect to FIG. 8a;

FIG. 10b is a main view of the linkage structure shown in FIG. 10a;

FIG. 10c is a side view of the linkage structure shown in FIG. 10a.

The same or similar reference numerals in the drawings denote the same or similar components.

DETAILED DESCRIPTION

Figure 1:
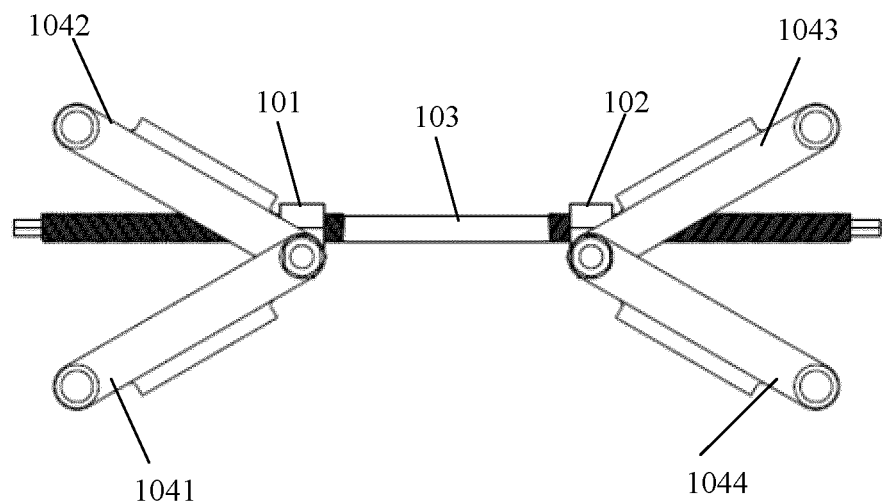
FIG. 1 is a structural schematic view of an upper bracket according to an example of the present disclosure.

The present disclosure provides a linkage structure comprising an upper bracket and a lower bracket, wherein said upper bracket comprises a first linkage unit, a second linkage unit, a middle piece and two sets of adjusting pieces, one end of said middle piece is connected to said first linkage unit and the other end is connected to said second linkage unit; wherein at least one adjusting piece in one set of adjusting pieces is connected rotatably to said first linkage unit, and at least one adjusting piece in the other set of adjusting pieces is connected rotatably to said second linkage unit.

Wherein, the two sets of adjusting pieces are respectively located on two sides of the middle piece. Wherein, the first linkage unit may be directly connected to each adjusting piece in one set of adjusting pieces, or may be directly connected to only part of the adjusting pieces in that set of adjusting pieces; similarly, the second linkage unit may be directly connected to each adjusting piece in the other set of adjusting pieces, or may be directly connected to only part of the adjusting pieces in that other set of adjusting pieces. Wherein, the first linkage unit and the second linkage unit may be connected to the end point of at least one adjusting piece, or may be connected to other parts of at least one adjusting piece (such as the middle part, at ⅓ distance from the endpoint).

Wherein, each set of adjusting pieces include at least two adjusting pieces, each adjusting piece in each set may be directly connected or may not be directly connected. It should be noted that, the adjusting pieces located on two sides of the middle piece may be symmetrical or may be asymmetrical, which is not limited in the present disclosure.

In some examples, for each adjusting piece, one end of the adjusting piece is connected rotatably to the first linkage unit or the second linkage unit, and the other end is for connecting rotatably to other structure, and this other structure may be included in the linkage structure or may be outside the linkage structure.

In some examples, the first linkage unit is connected to the middle part of one adjusting piece in one set of adjusting pieces, and the second linkage unit is connected to the middle part of one adjusting piece in the other set of adjusting pieces.

It should be noted that, the examples above are merely for better illustrating the technical solution of the present disclosure and not for limiting the present disclosure in any way. Those skilled in the art would understand that, any means for implementing the connection between an adjusting piece and the first linkage unit or the second linkage unit shall fall in the scope of the present disclosure.

In some embodiments, the connection between the middle piece and the first linkage unit or the second linkage unit may be rotatable or may be fixed.

Wherein, the lower bracket is for cooperating with the upper bracket to achieve mechanical tilt. In practice, the upper bracket is connected to a first object and a second object, and the lower bracket is connected to the first object and the second object; normally the lower bracket is located beneath the upper bracket. In this context, the first object is considered as a supporting object and the second object is considered as an object that requires mechanical tilt, in other words, the first object is fixed and the second object can be mechanically tilted. It should be noted that, the first object may be any object capable of supporting such as wall body, a holding pole, or the like, and the second object may be any object having a tilting requirement, such as a radio frequency unit, an antenna, or the like.

It should be noted that, after the linkage structure is connected to the first object and the second object, in the initial state, the tilt angle between the first object and the second object may be 0° or any other angle. In the process of implementing mechanical tilt, through adjusting at least one of the first linkage unit, the second linkage unit and the middle piece, the first linkage unit and the second linkage unit can be driven to move in relation to each other, making the distance between the first linkage unit and the second linkage unit increase or decrease (wherein, the first linkage unit and the second linkage unit may move forward or backward in the direction of the middle piece, and at the same time, the movement directions of the first linkage unit and the second linkage unit are opposite), thereby driving the two sets of adjusting pieces to move in coordination and then driving the rotation shaft to rotate, so that the second object can be pushed steadily in one direction and the second object can be rotated to a designated angle.

It should be noted that, the rotation shaft may be a component belonging to the lower bracket, or may be an independent component, or even may be a component belonging to the first object or the second object; as an example, the lower bracket includes a rotation shaft and a component for connecting fixedly to the first object, and the second object includes a component for connecting rotatably to the rotation shaft; as another example, the lower bracket includes a rotation shaft and a component for connecting fixedly to the second object, and the first object includes a component for connecting rotatably to the rotation shaft; as another example, the lower bracket includes a rotation shaft, a component for connecting fixedly to the first object, and a component for connecting fixedly to the second object.

It should be noted that, in the present disclosure, the connections of the junctions between each unit or component can be realized by means of screws, rivets, or the like, which is not limited in the present disclosure.

In some embodiments, the first linkage unit has a first through hole for cooperating with the middle piece, the second linkage unit has a second through hole for cooperating with the middle piece, and the middle piece goes through the first through hole and the second through hole.

As a preferred solution, the first through hole and the second through hole have threads therein, one side of the middle piece has threads for cooperating with the threads within the first through hole, and the other side of the middle piece has threads for cooperating with the threads within the second through hole. In this preferred solution, the middle piece may be any structure having threads on both sides, such as a screw bolt, a threaded rod having external threads on both sides, or the like.

Based on the linkage structure of the preferred solution, at least one of the middle piece, the first linkage unit with internal threads and the second linkage unit with internal threads can be turned, in order to increase or decrease the distance between the first linkage unit and the second linkage unit, thereby driving the two sets of adjusting pieces to move in coordination. It should be noted that, since the first through hole and the second through hole in the linkage structure of the preferred solution both have threads therein, after the second object is rotated to a designated angle based on the linkage structure, it can be made sure that the second object is maintained at the designated angle without having to perform any other locking operation.

As another preferred solution, the first through hole has threads therein, the middle piece comprises a head and a rod, all or part of the rod has threads for cooperating with the threads within the first through hole, and the head is stuck on the outside of the second through hole. In this preferred solution, the first linkage unit may be any structure having a threaded hole, such as a T-socket, an L-socket, a dumbbell socket, or the like. In some examples, the middle piece is a screw bolt or other L/T-form structure.

Preferably, the linkage structure further comprises a first locking unit for locking the middle piece, wherein the first locking unit can be any structure that can be used for locking the middle piece, such as a snap joint structure, a screw nut, or the like. In some examples, all the junctions in the linkage structure use rivets, after the two sets of adjusting pieces are driven to rotate the second object to a designated angle, it is only need to lock the first locking unit to fix the tilt angle at the designated angle, this way of locking can better ensure the fixation of the tilt angle. It should be noted that, even if the linkage structure of this preferred solution does not have the first locking unit, the tilt angle can still be fixed at the designated angle through the cooperation between the middle piece and the threaded hole within the T-socket.

Based on the linkage structure of the preferred solution, the distance between the first linkage unit and the second linkage unit can be increased or decreased by turning the middle piece of the first linkage unit, thereby driving the two sets of adjusting pieces to move in coordination.

In some embodiments, the middle piece comprises multiple segments that can be moved relative to one another. For example, the middle piece includes two segments, wherein one segment can be partly sleeved on the other segment, and the two segments can move in relation to each other. For another example, the middle piece includes three segments, which are a first segment on one side, a second segment in the middle and a third segment on the other side, one end of the third segment is sleeved on one end of the first segment, and the other end of the third segment is sleeved on one end of the second segment.

As an exemplary implementation, the first linkage unit has a first blind hole or a third through hole, the second linkage unit has a second blind hole or a fourth through hole, one segment of the multiple segments cooperates with the first blind hole or the third through hole, and another segment of the multiple segments cooperates with the second blind hole or the fourth through hole. It should be noted that, as for the hole on the first linkage unit and the hole on the second linkage unit, both of them may have threads therein, or only one of them has threads therein, or neither of them has threads therein. For example, the first linkage unit has a first blind hole thereon, the second linkage unit has a second blind hole thereon, the first blind hole and the second blind hole both have internal threads therein, all or part of the segment for cooperating with the first blind hole in the multiple segments has external threads, and all or part of the other segment for cooperating with the second blind hole in the multiple segments has external threads.

As another exemplary implementation, one segment of the multiple segments is connected fixedly on the first linkage unit, and another segment of the multiple segments is connected fixedly on the second linkage unit.

Preferably, the linkage structure further comprises a second locking unit for locking the multiple segments. Wherein, the second locking unit can be any structure that can be used for locking the multiple segments, such as at least one snap joint structure or at least one screw nut.

In some embodiments, the first linkage unit has only one rotation joint, at least one adjusting piece in one set of adjusting pieces is connected rotatably to the rotation joint on said first linkage unit, said second linkage unit has only one rotation joint, and at least one adjusting piece in the other set of adjusting pieces is connected rotatably to the rotation joint on said second linkage unit.

As an example, both the first linkage unit and the second linkage unit have only one rotation joint, each set of adjusting pieces includes two adjusting pieces, the two adjusting pieces in one set of adjusting pieces are connected rotatably to the rotation joint on the first linkage unit, and the two adjusting pieces in the other set of adjusting pieces are connected rotatably to the rotation joint on the second linkage unit. In this example, the two adjusting pieces in each set of adjusting pieces are connected directly.

In some embodiments, said first linkage unit has two rotation joints, at least two adjusting pieces in one set of adjusting pieces are respectively connected rotatably to the two rotation joints on said first linkage unit, said second linkage unit has two rotation joints, and at least two adjusting pieces in the other set of adjusting pieces are respectively connected rotatably to the two rotation joints on said second linkage unit.

As an example, both the first linkage unit and the second linkage unit have only two rotation joints, each set of adjusting pieces includes two adjusting pieces, the two adjusting pieces in one set of adjusting pieces are respectively connected rotatably to the two rotation joints on the first linkage unit, and the two adjusting pieces in the other set of adjusting pieces are respectively connected rotatably to the two rotation joints on the second linkage unit. In this example, the two adjusting pieces in each set of adjusting pieces are not connected directly.

In some embodiments, each adjusting piece in the two sets of adjusting pieces is of the same length.

In some embodiments, at least two adjusting pieces in the same set are of different lengths, and two symmetrical adjusting pieces located in different sets are of the same length. For example, each set of adjusting pieces includes two adjusting pieces, two adjusting pieces located in the same set are of different lengths, but two symmetrical adjusting pieces located in different sets are of the same length.

In some embodiments, the upper bracket further comprises a third linkage unit for connecting fixedly to a first object, wherein the third linkage unit is connected rotatably to at least one adjusting piece in each set of adjusting pieces. In some examples, the third linkage unit includes at least two independent linkage components, wherein one end of each linkage component is for connecting to an adjusting piece and the other end is for fixing on a first object; in some examples, the third linkage unit includes one support component and even number of rotation joints located on the support component, wherein the even number of rotation joints are for respectively connecting rotatably to even number of adjusting pieces located in different sets and symmetrically.

In some embodiments, the upper bracket further comprises a fourth linkage unit for connecting fixedly to a second object, wherein the fourth linkage unit is connected rotatably to at least one adjusting piece in each set of adjusting pieces. In some examples, the fourth linkage unit includes at least two independent linkage components, wherein one end of each linkage component is for connecting to an adjusting piece and the other end is for fixing on a second object; in some examples, the fourth linkage unit includes one support component and even number of rotation joints located on the support component, wherein the even number of rotation joints are for respectively connecting rotatably to even number of adjusting pieces located in different sets and symmetrically.

In some embodiments, the linkage structure furthermore comprises a fifth linkage unit for connecting the upper bracket and the lower bracket. Wherein, the fifth linkage unit is connected fixedly or removably to the upper bracket and the lower bracket. The linkage structure of the embodiments is rather suitable for mechanical tilt of medium and small-sized objects. It should be noted that, by designing the fifth linkage unit of different sizes, mechanical tilt of objects of different levels can be adapted.

The present disclosure will be described in more detail in the following with reference to the drawings.

FIG. 1 is a structural schematic view of an upper bracket according to an example of the present disclosure. The upper bracket includes a first linkage unit 101, a second linkage unit 102, a middle piece 103 and two sets of adjusting pieces (one set of adjusting pieces includes 1041 and 1042, the other set of adjusting pieces includes 1043 and 1044).

Wherein, the two sets of adjusting pieces are located respectively on two sides of the middle piece 103, each adjusting piece is of the same length, and the two sets of adjusting pieces are symmetrical about an axis of symmetry (not shown). Wherein, the adjusting pieces 1041 and 1042 are both connected rotatably to the first linkage unit 101, and the adjusting pieces 1041 and 1042 are also connected rotatably with each other; the adjusting pieces 1043 and 1044 are both connected rotatably to the second linkage unit 102, and the adjusting pieces 1043 and 1044 are also connected rotatably with each other. Wherein, the middle piece 103 is a threaded rod with external threads on both ends, the first linkage unit 101 has thereon a first through hole (not shown), the second linkage unit 102 has thereon a second through hole (not shown), the first through hole has therein internal threads for cooperating with the left-side external threads of the middle piece 103, the second through hole has therein internal threads for cooperating with the right-side external threads of the middle piece 103, and the middle piece 103 goes through the first through hole and the second through hole.

As an exemplary application scenario of the upper bracket shown in FIG. 1, the first object has thereon two rotation joints for connecting rotatably to the upper bracket shown in FIG. 1, and the two rotation joints are respectively connected rotatably to the adjusting pieces 1042 and 1043; the second object also has thereon two rotation joints for connecting rotatably to the upper bracket shown in FIG. 1, and the two rotation joints are respectively connected rotatably to the adjusting pieces 1041 and 1044. Thereby the connection between the upper bracket shown in FIG. 1 and the two objects can be achieved.

After the linkage structure including the upper bracket shown in FIG. 1 is connected to the first object and the second object (it should be noted that, the specific structure of the lower bracket is not shown in this example, and the specific connection about the lower bracket will not be detailed herein), when mechanical tilt is required, the first linkage unit 101 and the second linkage unit 102 can be driven to move in relation to each other by turning the middle piece 103, making the distance between the first linkage unit 101 and the second linkage unit 102 increase or decrease, thereby driving the four adjusting pieces to rotate in coordination and then driving the rotation shaft on the other side (the rotation shaft in the lower bracket or the rotation shaft connected with the lower bracket) to rotate, and the second object can thus be rotated to the designated angle. It should be noted that, in this example, since the middle piece 103 has external threads on both sides, and both the first through hole and the second through hole have internal threads for cooperating with the middle piece 103, after the second object is rotated to a certain angle, it can be directly made sure that the mechanical tilt is maintained at the certain angle without other locking operation.

As an exemplary evolutional structure of the upper bracket shown in FIG. 1, the adjusting pieces 1041 and 1042 are directly connected rotatably, the adjusting pieces 1043 and 1044 are directly connected rotatably, the first linkage unit 101 is connected rotatably to the middle part of the adjusting piece 1042, and the second linkage unit 102 is connected rotatably to the middle part of the adjusting piece 1043.

Figure 2A:
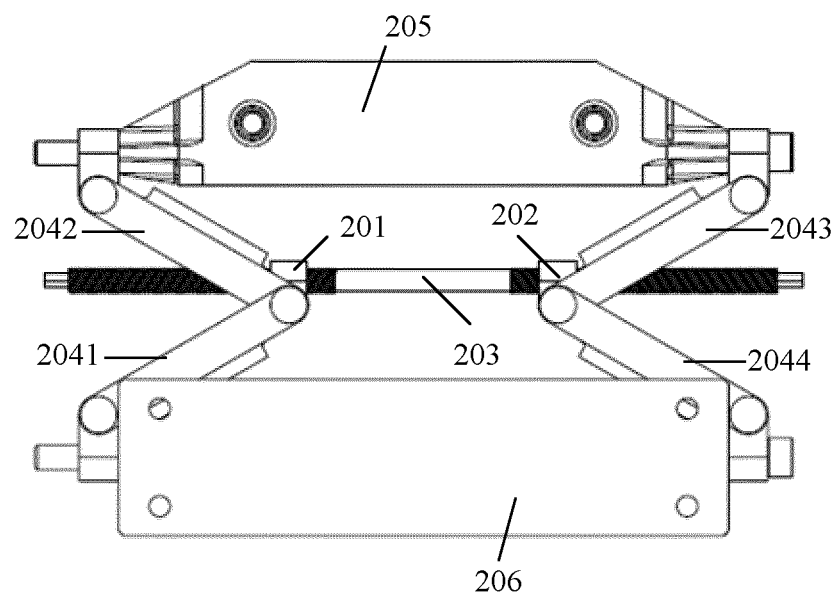
FIG. 2a is a main view of an upper bracket according to another example of the present disclosure.
Figure 2B:
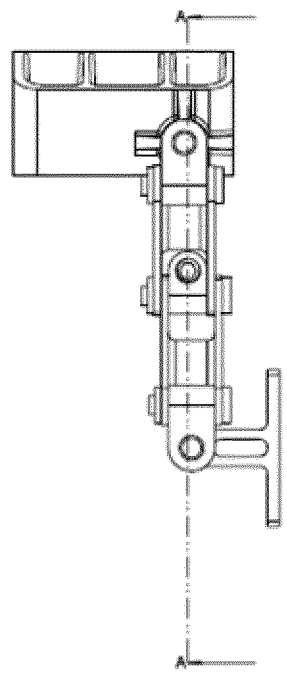
Figure 2C:
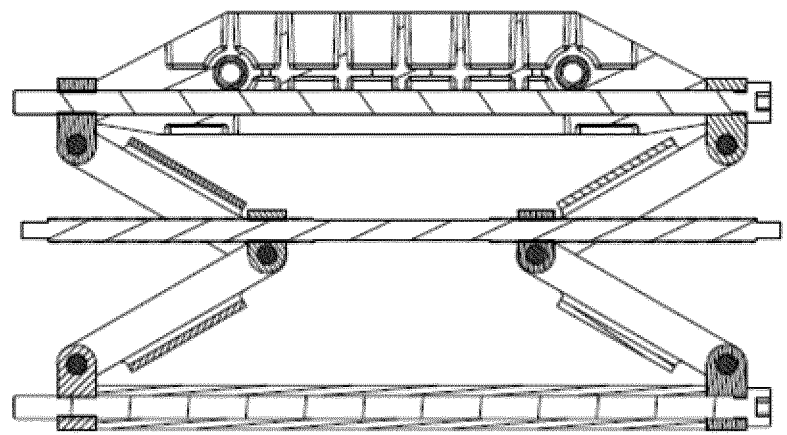
FIG. 2c is a sectional view along the A-A section in FIG. 2b.

FIG. 2*a* is a main view of the upper bracket according to another example of the present disclosure, FIG. 2*b* is a side view of the upper bracket shown in FIG. 2*a*, and FIG. 2*c* is the sectional view along the A-A section in FIG. 2*b*. The upper bracket includes a first linkage unit 201, a second linkage unit 202, a middle piece 203, two sets of adjusting pieces (one set of adjusting pieces includes 2041 and 2042, the other set of adjusting pieces includes 2043 and 2044), a third linkage unit 205 and a fourth linkage unit 206.

Wherein, the two sets of adjusting pieces are located respectively on two sides of the middle piece 203, each adjusting piece is of the same length, and the two sets of adjusting pieces are symmetrical about an axis of symmetry (not shown). Wherein, one end of the adjusting piece 2041 is connected rotatably to the second linkage unit 202 and the other end is connected rotatably to the fourth linkage unit 206, one end of the adjusting piece 2042 is connected rotatably to the second linkage unit 202 and the other end is connected rotatably to the third linkage unit 205, one end of the adjusting piece 2043 is connected rotatably to the first linkage unit 201 and the other end is connected rotatably to the third linkage unit 205, one end of the adjusting piece 2044 is connected rotatably to the first linkage unit 201 and the other end is connected rotatably to the fourth linkage unit 206.

Wherein, the first linkage unit 201 is the same as or similar to the first linkage unit 101 in the above-mentioned FIG. 1, the second linkage unit 202 is the same as or similar to the second linkage unit 102 in the above-mentioned FIG. 1, the middle piece 203 is the same as or similar to the middle piece 103 in the above-mentioned FIG. 1, therefore the first linkage unit 201, the second linkage unit 202 and the middle piece 203 will not be described in detail in this example.

In an exemplary application, the third linkage unit 205 is connected fixedly to the first object, the fourth linkage unit 206 is connected fixedly to the second object, so that the connection between the upper bracket as shown in FIG. 2*a* and the two objects can be achieved.

When carrying out mechanical tilt based on the upper bracket shown in FIG. 2*a*, the first linkage unit 201 and the second linkage unit 202 can be driven to move in relation to each other by turning the middle piece 203 with a wrench, making the distance between the first linkage unit 201 and the second linkage unit 202 increase or decrease, thereby driving the two sets of adjusting pieces to rotate in coordination and then driving the rotation shaft on the other side (the rotation shaft in the lower bracket or the rotation shaft connected with the lower bracket) into rotation, and the second object can thus be rotated to a designated angle.

Figure 3A:
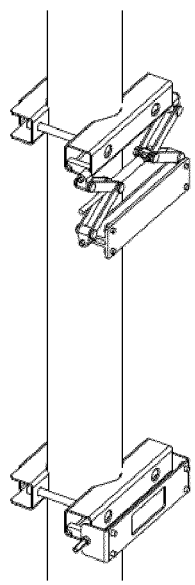
FIG. 3a is a structural schematic view of a linkage structure according to an example of the present disclosure.
Figure 3B:
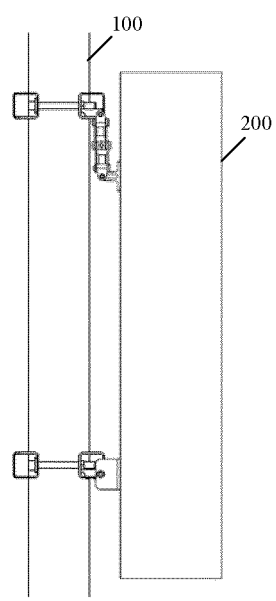
Figure 3C:
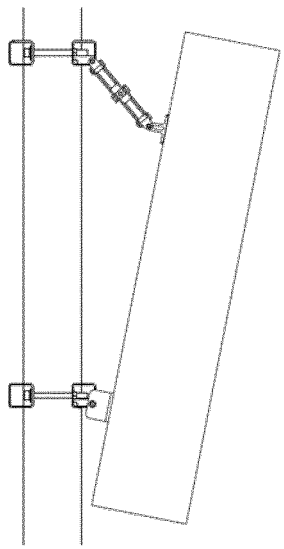
FIG. 3c is a structural schematic view after the second object in FIG. 3b is rotated to a certain angle.
Figure 3D:
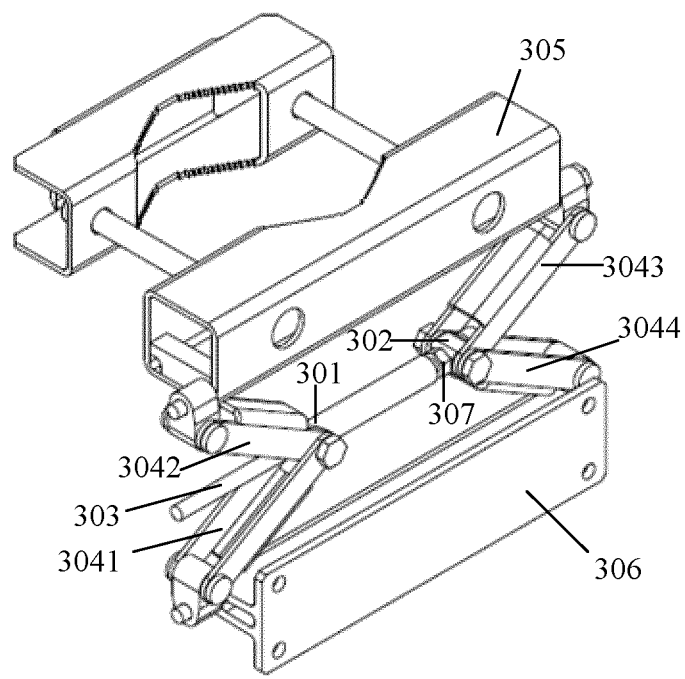

FIG. 3*a* is a structural schematic view of a linkage structure according to an example of the present disclosure, in which the structure after connecting the linkage structure to a first object 100 is shown; FIG. 3*b* is a schematic view of an integral structure after connecting two objects with the linkage structure shown in FIG. 3*a*, at this point the tilt angle between the first object and the second object is 0°, which is viewed as the initial state after connection; FIG. 3*c* is a structural schematic view after the second object in FIG. 3*b* is rotated to a certain angle, i.e., at this point the tilt angle between the first object and the second object is that certain angle. FIG. 3*d* is a structural schematic view of the upper bracket in FIG. 3*a*, FIG. 3*e* is a main view of the upper bracket shown in FIG. 3*d*, FIG. 3*f* is a sectional view along the B-B section in FIG. 3*e*, FIG. 3*g* is a structural schematic view of the lower bracket in FIG. 3*a*, FIG. 3*h* is a main view of the lower bracket shown in FIG. 3*g*.

Figure 3E:
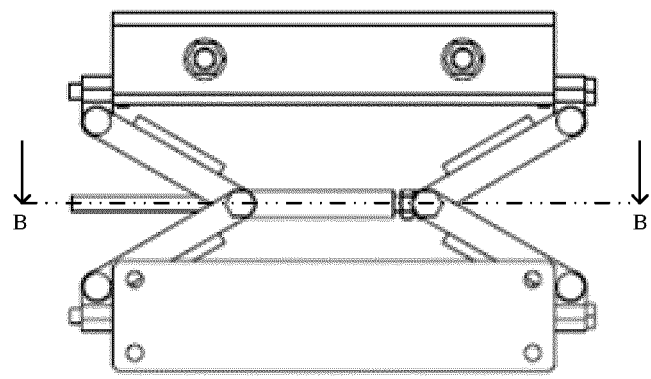
FIG. 3e is a main view of the upper bracket shown in FIG. 3d.
Figure 3F:
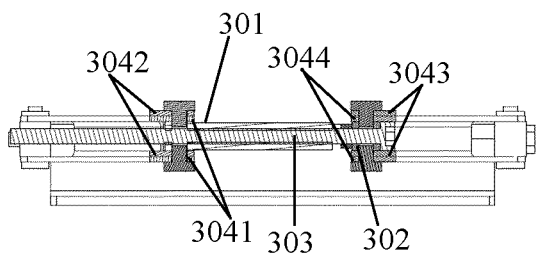
FIG. 3f is a sectional view along the B-B section in FIG. 3e.

As can be seen from FIGS. 3*d*, 3*e* and 3*f*, the linkage structure includes an upper bracket 300 and a lower bracket 400, the upper bracket 300 includes a first linkage unit 301, a second linkage unit 302, a middle piece 303, two sets of adjusting pieces (one set of adjusting pieces includes 3041 and 3042, the other set of adjusting pieces includes 3043 and 3044), a third linkage unit 305, a fourth linkage unit 306 and a first locking unit 307. Wherein, the two sets of adjusting pieces are located respectively on two sides of the middle piece 303, each adjusting piece is of the same length, and the two sets of adjusting pieces are symmetrical about an axis of symmetry (not shown). Wherein, one end of the adjusting piece 3041 is connected rotatably to the first linkage unit 301 and the other end is connected rotatably to the fourth linkage unit 306, one end of the adjusting piece 3042 is connected rotatably to the first linkage unit 301 and the other end is connected rotatably to the third linkage unit 305, one end of the adjusting piece 3043 is connected rotatably to the second linkage unit 302 and the other end is connected rotatably to the third linkage unit 305, one end of the adjusting piece 3044 is connected rotatably to the second linkage unit 302 and the other end is connected rotatably to the fourth linkage unit 306. Wherein, the first linkage unit 301 is a T-socket that has therein a threaded hole (i.e. the first through hole), the second linkage unit 302 is a support piece that has a second through hole, the middle piece 303 is a screw bolt, the head of the screw bolt is stuck outside the second through hole, and the rod of the screw bolt goes through the second through hole and cooperates with the threaded hole within the T-socket. Wherein, the first locking unit 307 is a screw nut sleeved on the middle piece 303, and after the second object 200 is rotated to a certain angle, it can be made sure that the mechanical tilt is maintained at the certain angle by locking the first locking unit 307.

Figure 3G:
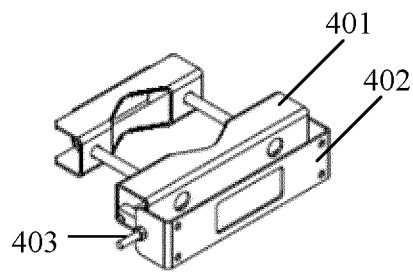
Figure 3H:
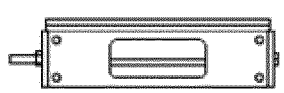
FIG. 3h is a main view of the lower bracket shown in FIG. 3g.

As can be seen from FIGS. 3*g* and 3*h*, the lower bracket 400 includes a component 401 for connecting fixedly to the first object 100, a component 402 for connecting fixedly to the second object 200, and a rotation shaft 403.

Wherein, for the structure shown in FIG. 3*b*, the first linkage unit 301 and the second linkage unit 302 can be driven to move in relation to each other by turning the middle piece 303 with a wrench, thereby driving the two sets of adjusting pieces to rotate in coordination and then driving the rotation shaft 403 to rotate, and the second object can thus be rotated to a designated angle. In this example, the distance between the first linkage unit 301 and the second linkage unit 302 increases gradually by turning the middle piece 303, thereby driving the two sets of adjusting pieces to rotate in coordination and then driving the rotation shaft 403 to rotate, thus obtaining the structure as shown in FIG. 3*c*.

Figure 4:
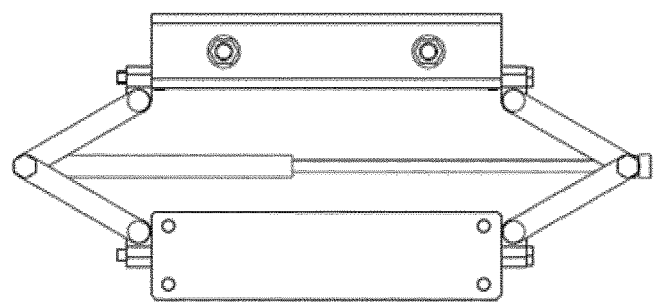
FIG. 4 is a main view of an upper bracket according to another example of the present disclosure.

FIG. 4 is a main view of an upper bracket according to another example of the present disclosure. It should be noted that, FIG. 4 and FIG. 3*e* can be viewed as two possible manifestations of the same upper bracket; in some examples, for the upper bracket shown in FIG. 3*e*, the distance between the first linkage unit 301 and the second linkage unit 302 increases gradually by turning the middle piece 303, thereby adjusting the tilt angle; whereas in some other examples, for the upper bracket shown in FIG. 4, the distance between the first linkage unit and the second linkage unit decreases gradually by turning the middle piece, thereby adjusting the tilt angle.

Figure 5A:
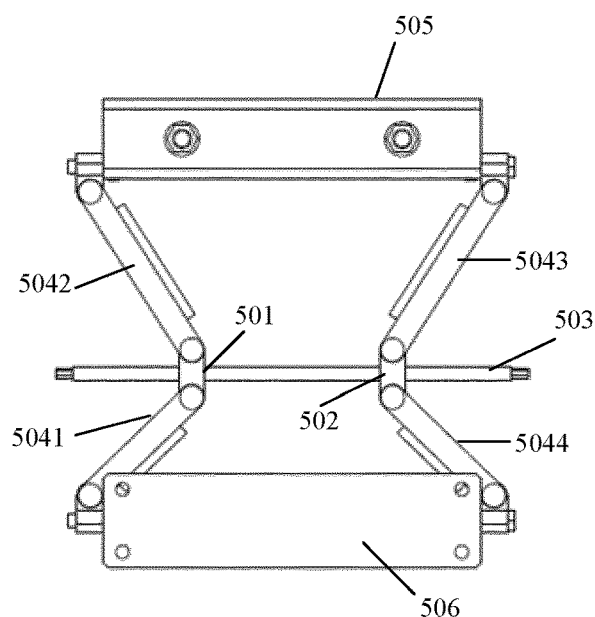
FIG. 5a is a main view of an upper bracket according to another example of the present disclosure.
Figure 5B:
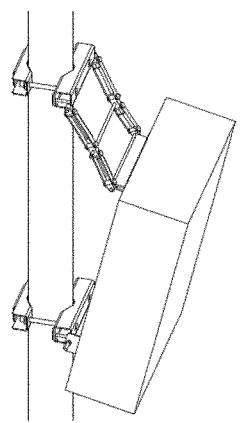

FIG. 5*a* is a main view of an upper bracket according to another example of the present disclosure, FIG. 5*b* is a schematic view of carrying out mechanical tilt based on a linkage structure including the upper bracket shown in FIG. 5a (the lower bracket in the linkage structure will not be described in detail in this example). The upper bracket of this example includes a first linkage unit 501, a second linkage unit 502, a middle piece 503, two sets of adjusting pieces (one set of adjusting pieces includes 5041 and 5042, the other set of adjusting pieces includes 5043 and 5044), a third linkage unit 505 and a fourth linkage unit 506.

As can be seen from FIG. 5a, the two adjusting pieces in the same set are of different lengths (that is, adjusting pieces 5041 and 5042 are of different lengths, and adjusting pieces 5043 and 5044 are of different lengths), but the two symmetrical adjusting pieces belonging to different sets are of the same length (that is, adjusting pieces 5041 and 5044 are of the same length, and adjusting pieces 5042 and 5043 are of the same length). Wherein, the first linkage unit 501 has two rotation joints, and the two rotation joints are respectively connected rotatably to the adjusting pieces 5041 and 5042; the second linkage unit 502 also has two rotation joints, and the two rotation joints are respectively connected rotatably to the adjusting pieces 5043 and 5044; that is, the two adjusting pieces on the same side of the middle piece 503 are not connected directly.

Wherein, the middle piece 503 is the same as or similar to the middle piece 203 in the above-mentioned FIG. 2a, therefore will not be elaborated here; wherein, the third linkage unit 505 and the fourth linkage unit 506 are the same as or similar to the implementations of the corresponding components with the same functions in the above-mentioned FIG. 3d, therefore will not be elaborated here.

It should be noted that, as an exemplary evolutional structure of FIG. 5a, the first linkage unit 501 may be regarded as or replaced with an adjusting piece, the adjusting piece has a threaded hole or a structure with a threaded hole corresponding to the first linkage unit; likewise, the second linkage unit 502 may be regarded as or replaced with an adjusting piece, the adjusting piece has a threaded hole or a structure with a threaded hole corresponding to the second linkage unit. In this evolutional structure, each set of adjusting pieces includes three adjusting pieces.

Figure 6A:
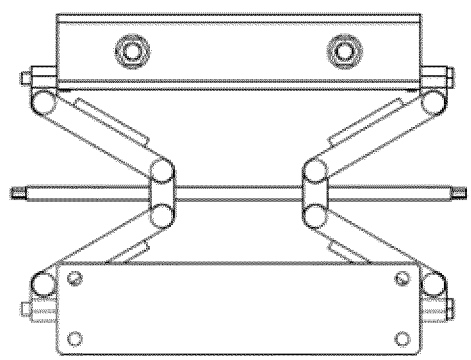
FIG. 6a is a main view of an upper bracket according to another example of the present disclosure.
Figure 6B:
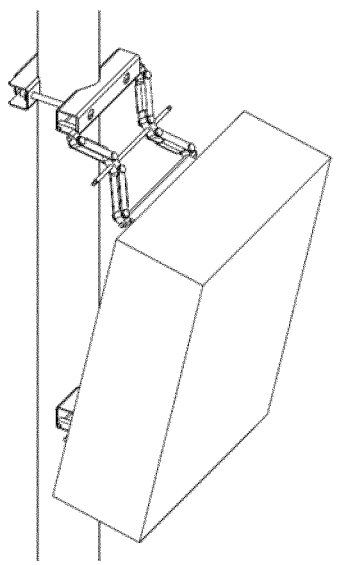

FIG. 6a is a main view of an upper bracket according to another example of the present disclosure, FIG. 6b is a schematic view of carrying out mechanical tilt based on a linkage structure including the upper bracket shown in FIG. 6a. The difference between FIG. 6a and FIG. 5a is only that the four adjusting pieces in FIG. 6a are of the same length.

Figure 7:
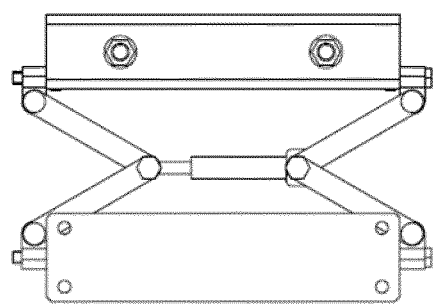
FIG. 7 is a main view of an upper bracket according to another example of the present disclosure.

FIG. 7 is a main view of the upper bracket according to another example of the present disclosure. The upper bracket shown in FIG. 7 is similar in structure to the upper bracket shown in FIG. 3d, and the detailed description of each component is not provided here. The difference between FIG. 7 and FIG. 3d is only that a T-socket is interchanged with the middle piece, therefore mechanical tilt can be achieved through adjusting of the T-socket.

Figure 8A:
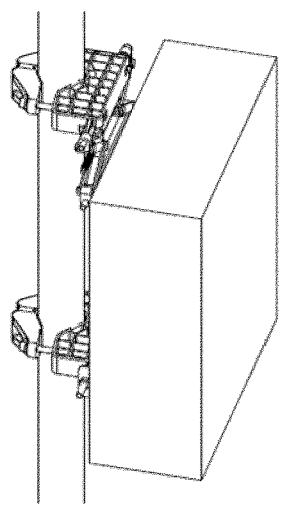
FIG. 8a is a schematic view of an integral structure in its initial state according to another example of the present disclosure.
Figure 8B:
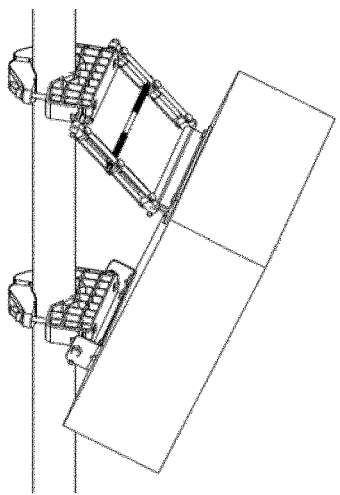
Figure 8C:
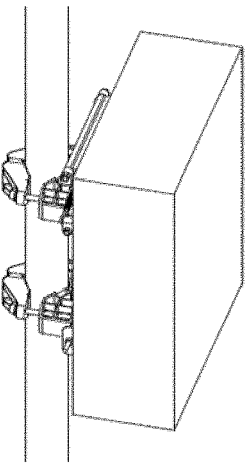
FIG. 8c is a schematic view of an integral structure in its initial state according to another example of the present disclosure.
Figure 8D:
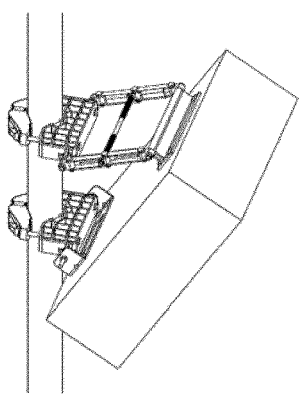
FIG. 8d is a schematic view of an integral structure after carrying out mechanical tilt with respect to FIG. 8c.

FIG. 8a is a schematic view of an integral structure in its initial state according to another example of the present disclosure, FIG. 8b is a schematic view of an integral structure after carrying out mechanical tilt with respect to FIG. 8a, FIG. 8c is a schematic view of an integral structure in its initial state according to another example of the present disclosure, FIG. 8d is a schematic view of an integral structure after carrying out mechanical tilt with respect to FIG. 8c. Wherein, the same linkage structure is used in FIGS. 8a, 8b, 8c and 8d, the difference is that, in FIGS. 8a and 8b the mounting distance D1 between the upper bracket and the lower bracket on the linkage structure is larger, whereas in FIGS. 8c and 8d the mounting distance D2 between the upper bracket and the lower bracket on the linkage structure is smaller. It should be noted that, FIG. 8b shows the largest tilt angle achievable by the linkage structure when the mounting distance is D1, and FIG. 8d shows the largest tilt angle achievable by the linkage structure when the mounting distance is D2, as can be seen from FIGS. 8b and 8d, the tilt angle achieved in FIG. 8d is obviously larger than the tilt angle achieved in FIG. 8b. Therefore, in practice, larger angle of mechanical tilt can be achieved by adjusting of the mounting distance between the upper bracket and the lower bracket without any changes to the structural design of the linkage structure.

Figure 9:
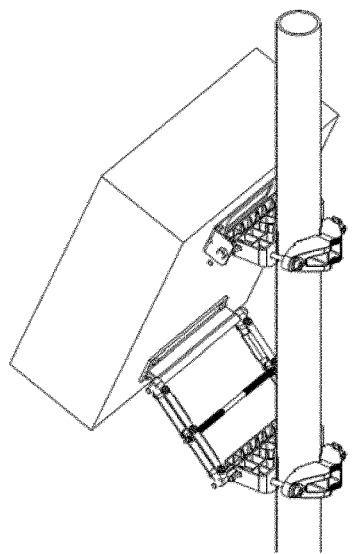
FIG. 9 is a schematic view of an integral structure of mechanical tilt according to another example of the present disclosure.

FIG. 9 is a schematic view of an integral structure of mechanical tilt according to another example of the present disclosure. For the integral structure shown in FIG. 8a, through interchanging the positional relation of the upper bracket and the lower bracket shown in FIG. 8a (that is, mounting the upper bracket shown in FIG. 8a below, and mounting the lower bracket shown in FIG. 8a above), the integral structure shown in FIG. 9 can be obtained. As can be seen from FIG. 9, by changing the positional relation of the upper bracket and the lower bracket, upward mechanical tilt can be achieved, thereby satisfying the mechanical tilt requirements under certain special cases.

Figure 10A:
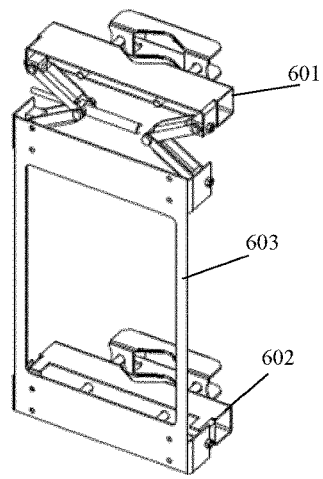
FIG. 10a is a schematic view of a linkage structure according to another example of the present disclosure.
Figure 10B:
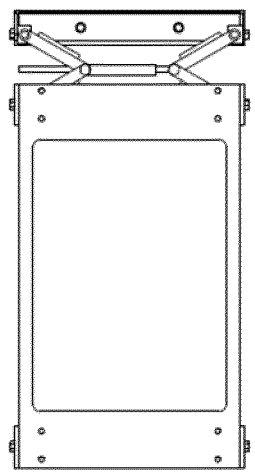
Figure 10C:
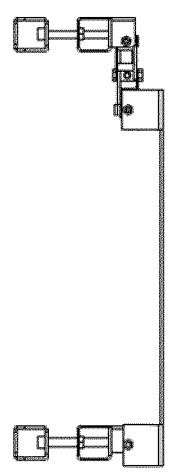

FIG. 10a is a schematic view of a linkage structure according to another example of the present disclosure, FIG. 10b is a main view of the linkage structure shown in FIG. 10a, and FIG. 10c is a side view of the linkage structure shown in FIG. 10a. The linkage structure in this example includes an upper bracket 601, a lower bracket 602 and a fifth linkage unit 603, wherein the fifth linkage unit 603 can be connected fixedly or removably to the upper bracket 601 and the lower bracket 602.

In the prior art, linkage structures for mechanical tilt are widely used in various fields to achieve linkage and mechanical tilt between two objects. The current linkage structures, when carrying out mechanical tilt, usually require loosening the screws at the joints first, then adjusting manually the position of the object whose tilt angle needs to be changed in order to adjust it to the required angle, and then fixing the screws while maintaining the object at this angle.

The present disclosure has found out that the technical solution of the prior art has the following problems: once the screws are loosened, the tilted object may slip down to maximum tilt angle, which may cause danger; it is difficult to maintain the object accurately at a designated tilt angle, for example, a linkage structure connects to a first object and a second object, if the second object needs to be tilted 5° downward, based on the solution of the prior art, what needs to be done is first adjusting the second object to a tilt angle of 5°, then holding the second object by hand to maintain it at the 5° tilt angle and then fastening the screws, then releasing the second object, the final tilt angle of the second object after being released may be 5.5° or may change to another angle due to weight and brackets deformation, this kind of change is unpredictable and is hard to be controlled and compensated; furthermore, the space on the first object is usually limited, it is difficult for an operator to hold the second object with one hand in order to maintain it at a certain angle while fastening the screws with the other hand, which would cause great inconvenience to the operator, and if the second object is rather heavy, it may need the cooperation of multiple operators.

With the linkage structure according to the present disclosure, two sets of adjusting pieces can be driven to move in coordination in order to push the second object steadily toward one direction, therefore the second object can be rotated to a designated angle conveniently and accurately, thereby ensuring the accuracy of mechanical tilt and realizing mechanical tilt at any angle; there is no need to perform any processing on the junction between the linkage structure and the first object or the second object while carrying out mechanical tilt, and therefore no need to worry about the second object slipping down to maximum tilt angle during operation, which avoids the danger caused by the looseness of the junction, and the operation process is very safe; there is no need for the operator to hold the second object by hand in order to keep it at a certain tilt angle while carrying out mechanical tilt, thereby providing the operator with great convenience and making the operation process very friendly; furthermore, there is no limit on the length and/or weight of the second object that requires mechanical tilt, for example, the present disclosure can be used for mechanical tilt of 5G products that are over 1000 mm long and weigh over 40 kg.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims instead of the above description, and all variations intended to fall into the meaning and scope of equivalent elements of the claims should be covered within the present disclosure. No reference signs in the claims should be regarded as limiting of the involved claims. Besides, it is apparent that the term "comprise" does not exclude other units or steps, and singularity does not plurality. A plurality of units or means stated in the apparatus claims may also be implemented by a single unit or means through software or hardware. Terms such as the first and the second are used to indicate names, but do not indicate any particular sequence.

The invention claimed is:

1. A linkage structure, comprising:
   an upper bracket and a lower bracket;
   a first linkage unit comprising a first upper adjusting piece rotatably connected to a first point on the upper bracket and a first lower adjusting piece rotatably connected to a first point on the lower bracket;
   a second linkage unit comprising a second upper adjusting piece rotatably connected to a second point on the upper bracket and a second lower adjusting piece rotatably connected to a second point on the lower bracket; and
   a middle piece horizontally connecting the first linkage unit and the second linkage unit;
   wherein at least one of the first upper adjusting piece or the first lower adjusting piece is connected rotatably to said first linkage unit, and at least one of the second upper adjusting piece or the second lower adjusting piece is connected rotatably to said second linkage unit; and
   wherein the second point on the upper bracket is distal from the first point on the upper bracket, and the second point on the lower bracket is distal from the first point on the lower bracket.

2. The linkage structure according to claim 1, wherein said first linkage unit has a first through hole for cooperating with said middle piece, said second linkage unit has a second through hole for cooperating with said middle piece, and said middle piece goes through said first through hole and said second through hole.

3. The linkage structure according to claim 2, wherein said first through hole and said second through hole have threads therein, one side of said middle piece has threads for cooperating with the threads within said first through hole, and the other side of said middle piece has threads for cooperating with the threads within said second through hole.

4. The linkage structure according to claim 2, wherein said first through hole has threads therein, said middle piece comprises a head and a rod, all or part of said rod has threads for cooperating with the threads within said first through hole, and said head is stuck on the outside of said second through hole.

5. The linkage structure according to claim 4, wherein said linkage structure further comprises a first locking unit for locking said middle piece.

6. The linkage structure according to claim 1, wherein said middle piece comprises multiple segments that can be moved relative to one another.

7. The linkage structure according to claim 6, wherein said first linkage unit has a first blind hole or a third through hole, said second linkage unit has a second blind hole or a fourth through hole, one segment of said multiple segments cooperates with said first blind hole or said third through hole, and another segment of said multiple segments cooperates with said second blind hole or said fourth through hole.

8. The linkage structure according to claim 6, wherein one segment of said multiple segments is connected fixedly on said first linkage unit, and another segment of said multiple segments is connected fixedly on said second linkage unit.

9. The linkage structure according to claim 6, wherein said linkage structure further comprises a second locking unit for locking said multiple segments.

10. The linkage structure according to claim 1, wherein said first linkage unit has only one rotation joint, at least one adjusting piece in one set of adjusting pieces is connected rotatably to the rotation joint on said first linkage unit, said second linkage unit has only one rotation joint, and at least one adjusting piece in the other set of adjusting pieces is connected rotatably to the rotation joint on said second linkage unit.

11. The linkage structure according to claim 1, wherein said first linkage unit has two rotation joints, at least two adjusting pieces in one set of adjusting pieces are respectively connected rotatably to the two rotation joints on said first linkage unit, said second linkage unit has two rotation joints, and at least two adjusting pieces in the other set of adjusting pieces are respectively connected rotatably to the two rotation joints on said second linkage unit.

12. The linkage structure according to claim 1, wherein each adjusting piece is of the same length, or at least two adjusting pieces in the same set are of different lengths, and two symmetrical adjusting pieces located in different sets are of the same length.

13. The linkage structure according to claim 1, wherein, said upper bracket further comprises a third linkage unit for connecting fixedly to a first object, wherein said third linkage unit is connected rotatably to at least one adjusting piece in each set of adjusting pieces.

14. The linkage structure according to claim 1, wherein said upper bracket further comprises a fourth linkage unit for connecting fixedly to a second object, wherein said fourth linkage unit is connected rotatably to at least one adjusting piece in each set of adjusting pieces.

15. The linkage structure according to claim 1, wherein said linkage structure further comprises a fifth linkage unit for connecting said upper bracket and said lower bracket.

* * * * *